United States Patent [19]
Koslowski

[11] 4,021,350
[45] May 3, 1977

[54] MEMBRANE FILTER SYSTEM

[75] Inventor: Günter Koslowski, Kirchhellen, Germany

[73] Assignee: Fried. Krupp Gessellschaft mit beschrankter Haftung, Essen, Germany

[22] Filed: July 22, 1975

[21] Appl. No.: 598,022

[30] Foreign Application Priority Data

Aug. 3, 1974 Germany .................... 2437446

[52] U.S. Cl. .................... 210/232; 210/321 R; 210/433 M; 285/249
[51] Int. Cl.² ............................. B01D 31/00
[58] Field of Search ........ 210/232, 321 R, 433 M, 210/450; 285/248, 249, 348, 354, 382.7

[56] References Cited
UNITED STATES PATENTS

| | | | |
|---|---|---|---|
| 3,480,147 | 11/1969 | Kanyok | 210/321 R |
| 3,485,374 | 12/1969 | Manjikian et al. | 210/321 R X |
| 3,542,204 | 11/1970 | Clark | 210/450 X |
| 3,767,502 | 10/1973 | Ishii et al. | 210/321 R X |

Primary Examiner—Frank A. Spear, Jr.
Assistant Examiner—Ferris H. Lander
Attorney, Agent, or Firm—Spencer & Kaye

[57] ABSTRACT

In a membrane filter system composed of a plurality of tubular membrane supporting pipes disposed in parallel and arranged to conduct a flow of concentrate under pressure, there is provided a deflection sleeve connecting together the ends of two of the pipes to conduct concentrate between the pipes in such a manner that concentrate is deflected as it passes through the sleeve and such deflection produces forces in the system parallel to the axes of the pipes, and a connecting unit connected between each pipe end and the sleeve for connecting them together and transmitting such axial forces from the sleeve to each supporting pipe.

15 Claims, 7 Drawing Figures

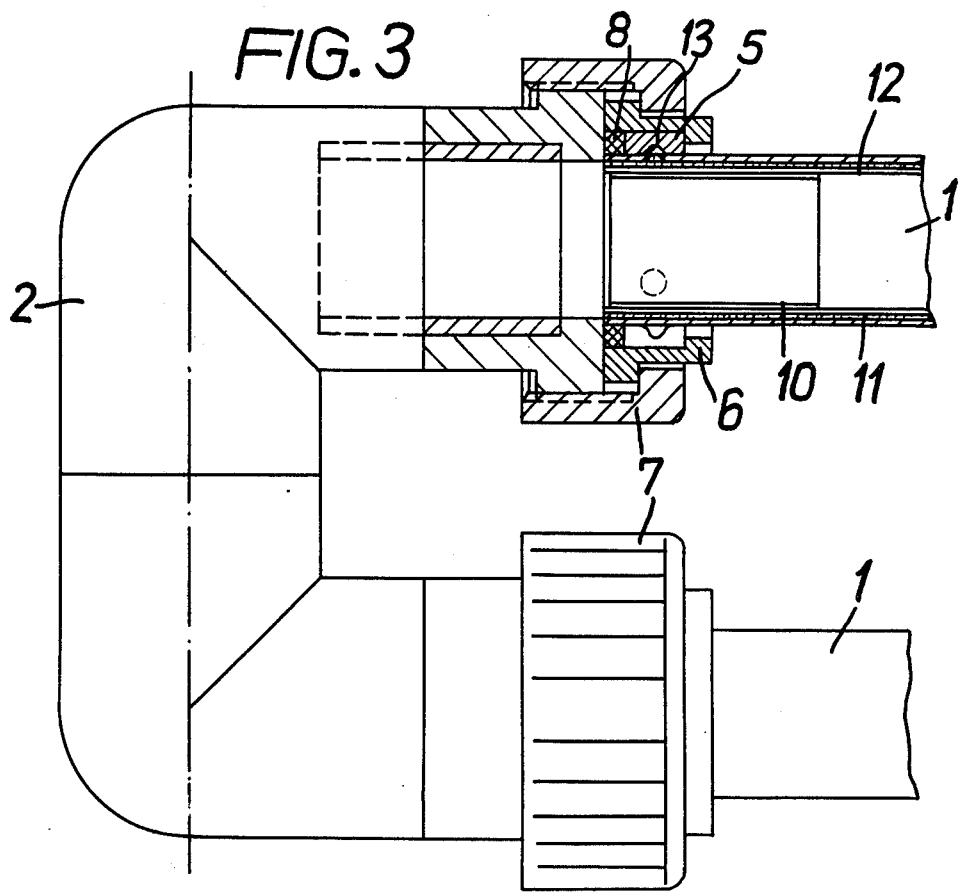
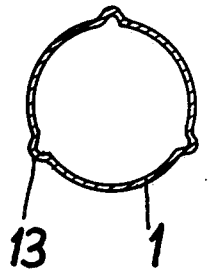
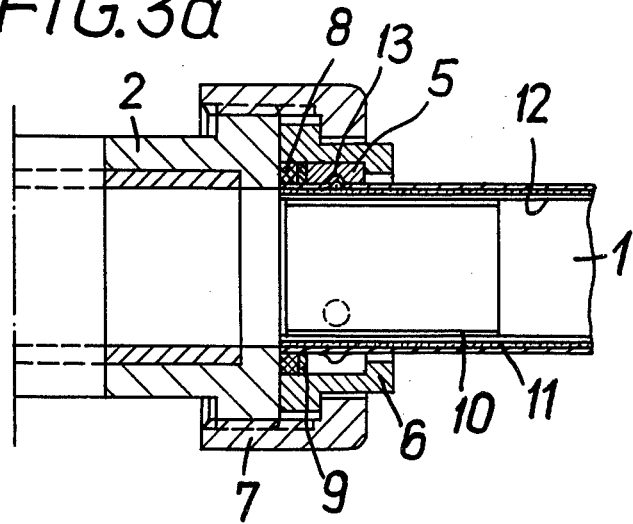

MEMBRANE FILTER SYSTEM

BACKGROUND OF THE INVENTION

The present invention relates to a membrane filter system of the type including a plurality of parallel arranged tubular membrane supporting pipes which are disposed inside jacket pipes which absorb the axial forces produced by deflection of concentrate under pressure along the membrane supporting pipes.

In membrane filter systems with tubular membrane supporting pipes, the individual supporting pipes are connected in parallel or in series depending on the particular requirements imposed on the system and are connected together by means of appropriate deflection members, so that optimum flow conditions for membrane filtering can be produced in the membrane hoses.

In known structures, the axial forces which are inevitably produced at the membrane supporting pipes by such deflections are absorbed by connecting rods or jacket pipes, in modular structures. This type of deflection requires jacket pipes of great thickness so that compact structures are difficult to attain and high construction costs are encountered. Repair of individual membrane supporting pipes is also very difficult due to the presence of sheathing.

SUMMARY OF THE INVENTION

It is therefore an object of the present invention to provide a membrane filter system which is not impeded by such sheathing, can be produced in any desired size, is easily installed and dismantled, and permits assembly of the membrane supporting pipes in close proximity to one another as well as fast repairs at the individual membrane supporting pipes.

These and other objects of the invention are achieved, in a membrane filter system composed of a plurality of tubular membrane supporting pipes disposed in parallel and arranged to conduct a flow of concentrate under pressure, by the provision of a deflection sleeve connecting together the ends of two of the pipes to conduct concentrate between the pipes in such a manner that concentrate is deflected as it passes through the sleeve and such deflection produces forces in the system parallel to the axes of the pipes; a device connected between at least one pipe end and the sleeve for transmitting such axial forces from the sleeve to each supporting pipe; a pressure ring disposed around the device; a deflection head disposed to enclose the pressure ring; a releasable connecting piece connected to the sleeve and operatively engaging the deflection head for releasably securing the pipe end to the deflection sleeve; and a sealing ring disposed between the pipe end and the deflection sleeve for sealing the region of connection therebetween.

The present invention offers the advantage of improved operational dependability since the number of possible points of malfunction is reduced to a minimum. By absorbing the axial forces in the available membrane supporting pipe it becomes possible to combine a plurality of pipes into a compact and more economical system. A further advance represented by the present invention is that the replacement of individual membrane supporting pipes for repair, or for modification projects at membrane filter systems, can be effected with the shortest possible installation and dismantling times, at low expense, and with the use of relatively unskilled labor.

BRIEF DESCRIPTION OF THE DRAWING

FIG. 3 is a view similar to that of FIG. 1 showing an arrangement similar to that of FIG. 2, but with the pipe ends provided with protrusions distributed around their peripheries.

FIG. 3a is a view similar to that of FIG. 1a showing a modified version of the arrangement of FIG. 3 with a sealing disc disposed between the pressure ring and O ring.

FIG. 3b is a cross-sectional end view of the end portion of one pipe with knobs distributed around its periphery.

DESCRIPTION OF THE PREFERRED EMBODIMENTS

Figure 1:
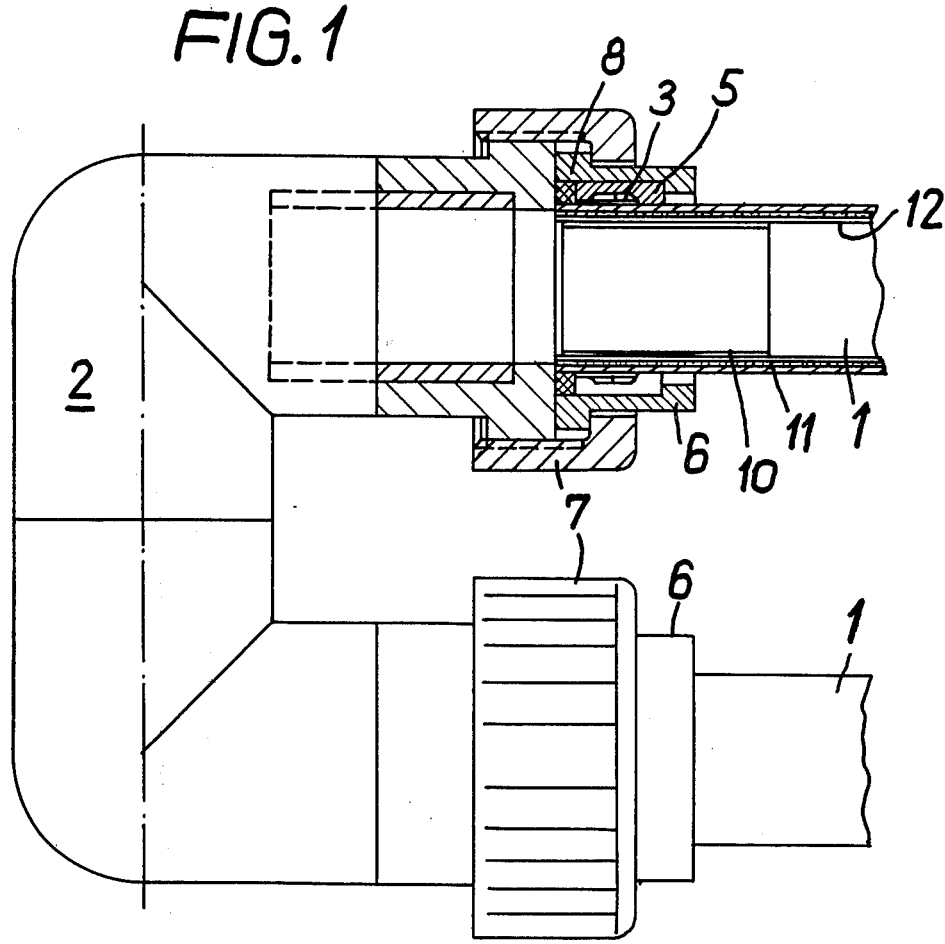
FIG. 1 is an elevational view, partly in cross section, of one preferred embodiment of the invention in which two membrane supporting pipe ends are connected together by a deflecting sleeve, the ends of the pipes being provided with biting rings.

The embodiment shown in FIG. 1 includes two tubular membrane supporting pipes connected together at their ends 1 by a deflection sleeve 2. Each supporting pipe is provided with a sintered layer 11 against the inner surface of its outer wall and a tubular membrane 12 is disposed within the layer 11. The sintered layer 11 fits loosely in the membrane supporting pipe. The sintered layer 11 may consist, for example, of glass fiber fleece, paper, sintered metals. The filtrate from the membrane 12 can flow in the sintered layer 11 without a high loss of pressure and then flows off through bores provided in the membrane supporting pipe. Because of their small size, these bores are not shown in the drawing.

At each pipe end 1 a sleeve 10 is provided and arranged to press outwardly against the supporting pipe from the inside. Sleeve 10 contributes to the fastening of the tubular membrane 12 and additionally imparts radial stiffness for the cutting, or bitting, ring connection which is sufficient even for thin supporting pipe walls.

The element for transmitting forces between deflection sleeve 2 and each supporting pipe is essentially a cutting ring 3 which is disposed on the end 1 of the supporting pipe. A pressure ring 5 is placed over the cutting ring 3, the pressure ring either being composed of two halves or being a one-piece ring having a slit, as indicated by the absence of crosshatching below the supporting pipe. A deflection head 6 provided with a releasable connecting device, e.g. a screw cap 7, is placed on the end 1 of the pipe before the pressure ring 5 is applied and is thereafter advanced in the direction toward end 1 of the pipe over pressure ring 5.

The deflection sleeve 2, which is made of plastic or other material, is provided at its ends with threads on which the screw caps 7 are screwed. Instead of the screw cap it is also possible to use a bayonet connection or some other releasable connection.

The screw cap 7 presses the deflection head 6 and the latter in turn presses pressure ring 5 against cutting ring 3 so that the axial forces produced by deflections are transferred to the supporting pipes. Between the pressure ring 5 and the end of the deflection sleeve 2 there is provided an 0 ring 8 which is framed by deflection head 6. By providing the 0 ring 8 a three-sided seal is produced. With precisely defined compression, the 0 ring 8 seals the concentrate off from the outside and simultaneously seals it against the deflection head 6 and seals the membrane supporting pipe toward the filtrate side.

The cutting ring 3 is a known connecting element which transmits axial forces in that during assembly the thin front edge of the cutting ring 3 is pressed by a tool into the outer surface of the membrane supporting pipe, causing a bead to form ahead of the ring 3, which bead prevents axial displacement. The pressure ring 5 encloses the cutting ring 3 and transmits the axial forces to the deflector head 6. The axial tension forces are absorbed in an advantageous manner by the membrane supporting pipe alone. This eliminates the need for such elements as, for instance, tension rods or jacket pipes used as tension elements.

Figure 1A:
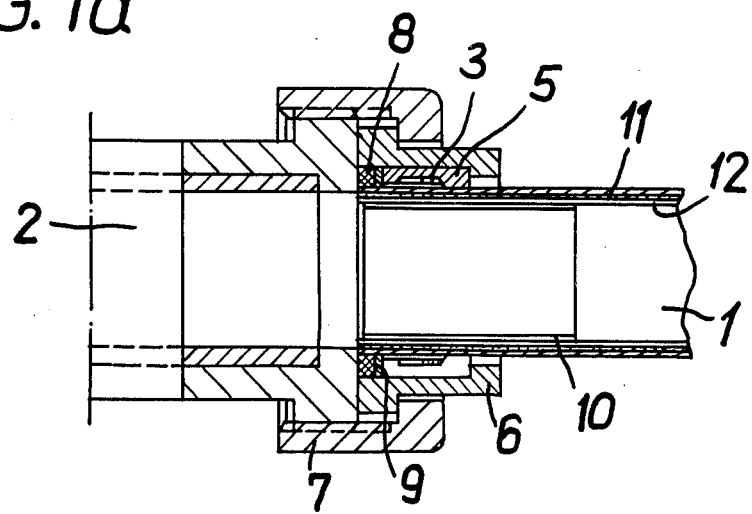
FIG. 1a is a detail view, partly in cross section, of a modified version of the arrangement of FIG. 1, with a sealing disc disposed between the pressure ring and O ring.

In the embodiment shown in FIG. 1a, a disc 9 is provided in the area of the 0 ring 8, at the side thereof directed toward the pressure ring 5, in order to prevent destruction of the 0 ring 8, in the area of the slit of pressure ring 5 or in the areas of ends of the two halves of pressure ring 5, when they are not in perfect abutting contact with one another.

Figure 2:
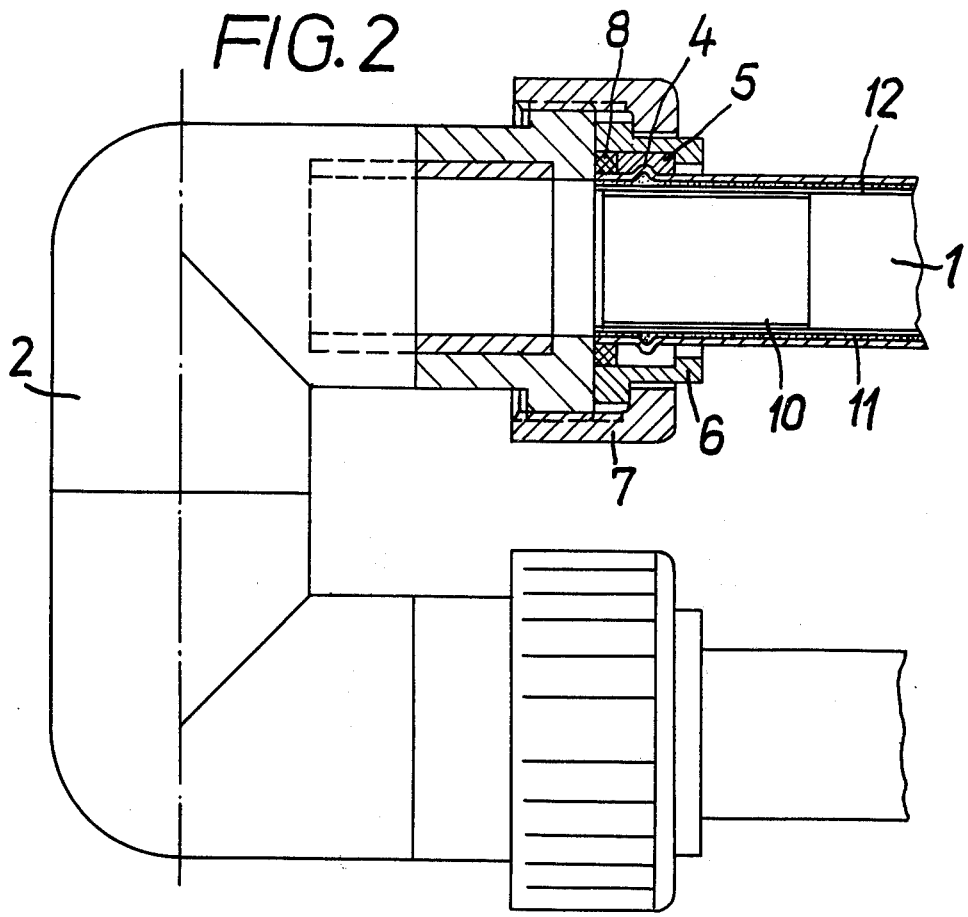
FIG. 2 is a view similar to that of FIG. 1 showing an embodiment in which the ends of the pipe have a bead around their circumference.
Figure 2A:
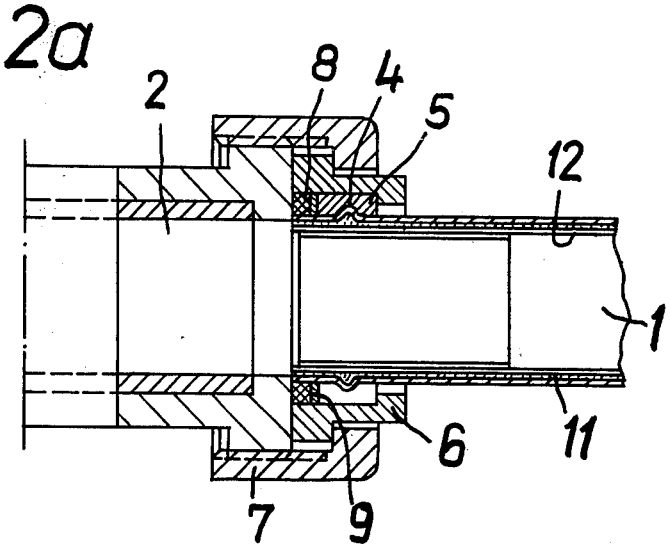
FIG. 2a is a view similar to that of FIG. 1a showing a modified version of the arrangement of FIG. 2 with a sealing disc disposed between the pressure ring and O ring.

In the embodiment shown in FIG. 2, the axial forces are transferred to the supporting tube by an outwardly projecting circular bead 4 formed in the supporting tube instead of the previously described biting ring 3. The further construction of the connection between the end 1 of the pipe and the deflection sleeve 2 corresponds to that described with reference to FIG. 1, except that the inner surface of ring 5 is formed to match bead 4. The embodiment shown in FIG. 2a is similar to that of FIG. 2 except that it is additionally provided with a disc 9 between the 0 ring 8 and the pressure ring 5 for the same purpose as in the embodiment of FIG. 1a.

In the embodiment shown in FIG. 3 the axial forces are transferred to the supporting pipe through rounded protuberances, or knobs, 13 which are distributed around the periphery of the end 1 of the pipe. In the embodiment of FIG. 3a, a disc 9 is again disposed between the 0 ring 8 and the pressure ring 5. The configuration of the end 1 of the pipe according to the invention with the knobs 13 distributed around its periphery is shown in the sectional view of FIG. 3b. The number of knobs 13 is selected arbitrarily. It will be understood that the above description of the present invention is susceptible to various modifications, changes and adaptations, and the same are intended to be comprehended within the meaning and range of equivalents of the appended claims.

What is claimed is:

1. In a membrane filter system composed of a plurality of membrane supporting pipes disposed parallel to one another and arranged to conduct a flow of concentrate under pressure, each pipe being provided with a tubular membrane, the system further including a deflection sleeve connecting together the end portions of two of the pipes to conduct concentrate between the pipes in such a manner that concentrate is deflected as it passes through the sleeve and such deflection produces forces in the system parallel to the axes of the pipes, the improvement comprising, at each pipe end portion which is connected to said deflection sleeve: a thin stiffening sleeve located within said pipe and arranged to press radially outwardly against said pipe for providing radial stiffening of said end portion and aiding fastening of said membrane in said pipe; a cutting ring disposed around said pipe end portion and provided with a cutting edge directed toward the extremity of said pipe end portion and pressed into the out surface of said pipe end portion at a location spaced from the extremity of said pipe end portion in a manner to prevent axial displacement of said cutting ring relative to said pipe in the axial direction toward the extremity of said pipe end portion; a pressure ring disposed around said cutting ring and engaging said cutting ring in a manner to urge said cutting ring in the direction of the axis of said pipe toward the extremity of said pipe end portion; a deflection head disposed to enclose said pressure ring and engaging said pressure ring in a manner to urge said pressure ring in the direction of the axis of said pipe toward the extremity of said pipe end portion; a releasable connecting piece operatively engaging said deflection head and connected to said sleeve for releasably securing said deflection head to said sleeve while applying to said deflection head a force directed along the axis of said pipe toward said deflection sleeve, whereby the axial force established between said sleeve and said deflection head and the engagement between said pipe and said cutting ring, between said cutting ring and said pressure ring, and between said pressure ring and said deflection head act to press said pipe end portion in an axial direction against said sleeve; and a sealing ring disposed between said pipe end portion and said deflection sleeve and bearing against said pressure ring for sealing the region of connection between said sleeve and said pipe end portion.

2. A system as defined in claim 1 wherein said pressure ring is a one-piece split ring.

3. A system as defined in claim 2 further comprising a protective disc interposed between said sealing ring and said pressure ring for protecting said sealing ring from damage by said pressure ring.

4. A system as defined in claim 1 wherein said pressure ring is composed of two half-rings.

5. A system as defined in claim 4 further comprising a protective disc interposed between said sealing ring and said pressure ring for protecting said sealing ring from damage by said pressure ring.

6. In a membrane filter system composed of a plurality of membrane supporting pipes disposed parallel to one another and arranged to conduct a flow of concentrate under pressure, each pipe being provided with a tubular membrane, the system further including a deflection sleeve connecting together the end portions of two of the pipes to conduct concentrate between the pipes in such a manner that concentrate is deflected as it passes through the sleeve and such deflection produces forces in the system parallel to the axes of the pipes, the improvement comprising, at each pipe end portion which is connected to said deflection sleeve: a thin stiffening sleeve located within said pipe and arranged to press radially outwardly against said pipe for providing radial stiffening of said end portion and aiding fastening of said membrane in said pipe; a circular, radially outwardly projecting bead formed in said pipe end portion at a location spaced from the extremity of said pipe end portion; a pressure ring disposed around said bead and engaging said bead in a manner to urge said bead in the direction of the axis of said pipe toward the extremity of said pipe end portion; a deflection head disposed to enclose said pressure ring and engaging said pressure ring in a manner to urge said pressure ring in the direction of the axis of said pipe toward the extremity of said pipe end portion; a releasable connecting piece operatively engaging said deflection head and connected to said sleeve for releasably securing said deflection head to said sleeve while applying to said deflection head a force directed along the axis of said pipe toward said deflection sleeve, whereby the axial force established between said sleeve and said deflection head and the engagement between said bead and said pressure ring, and between said pressure ring and said deflection head act to press said pipe end portion in an axial direction against said sleeve; and a sealing ring disposed between said pipe end portion and said deflection sleeve and bearing against said pressure ring for sealing the region of connection between said sleeve and said pipe end portion.

7. A system as defined in claim 6 wherein said pressure ring is a one-piece split ring.

8. A system as defined in claim 7 further comprising a protective disc interposed between said sealing ring and said pressure ring for protecting said sealing ring from damage by said pressure ring.

9. A system as define in claim 6 wherein said pressure ring is composed of two half-rings.

10. A system as defined in claim 9 further comprising a protective disc interposed between said sealing ring and said pressure ring for protecting said sealing ring from damage by said pressure ring.

11. In a membrane filter system composed of a plurality of membrane supporting pipes disposed parallel to one another and arranged to conduct a flow of concentrate under pressure, each pipe being provided with a tubular membrane, the system further including a deflection sleeve connecting together the end portions of two of the pipes to conduct concentrate between the pipes in such a manner that concentrate is deflected as it passes through the sleeve and such deflection produces forces in the system parallel to the axes of the pipes, the improvement comprising, at each pipe end portion which is connected to said deflection sleeve: a thin stiffening sleeve located within said pipe and arranged to press radially outwardly against said pipe for providing radial stiffening of said end portion and aiding fastening of said membrane in said pipe; a plurality of rounded protuberances formed in said pipe end portion to extend radially outwardly therefrom at a location spaced from the extremity of said pipe end portion, said protuberances being distributed around the periphery of said pipe; a pressure ring disposed around said protuberances and engaging said protuberances in a manner to urge said protuberances in the direction of the axis of said pipe toward the extremity of said pipe end portion; a deflection head disposed to enclose said pressure ring and engaging said pressure ring in a manner to urge said pressure ring in the direction of the axis of said pipe toward the extremity of said pipe end portion; a releasable connecting piece operatively engaging said deflection head and connected to said sleeve for releasably securing said deflection head to said sleeve while applying to said deflection head a force directed along the axis of said pipe toward said deflection sleeve, whereby the axial force established between said sleeve and said deflection head and the engagement between said protuberances and said pressure ring, and between said pressure ring and said deflection head act to press said pipe end portion in an axial direction against said sleeve; and a sealing ring disposed between said pipe end portion and said deflection sleeve and bearing against said pressure ring for sealing the region of connection between said sleeve and said pipe end portion.

12. A system as defined in claim 11 wherein said pressure ring is a one-piece split ring.

13. A system as defined in claim 12 further comprising a protective disc interposed between said sealing ring and said pressure ring for protecting said sealing ring from damage by said pressure ring.

14. A system as defined in claim 11 wherein said pressure ring is composed of two half-rings.

15. A system as defined in claim 14 further comprising a protective disc interposed between said sealing ring and said pressure ring for protecting said sealing ring from damage by said pressure ring.

* * * * *